June 7, 1955 J. D. BRADY 2,710,347

INTERFERENCE REDUCING CIRCUIT

Filed June 3, 1952 2 Sheets-Sheet 1

Inventor
John D. Brady
by Roberts, Cushman & Grover
att'ys.

June 7, 1955 J. D. BRADY 2,710,347

INTERFERENCE REDUCING CIRCUIT

Filed June 3, 1952 2 Sheets-Sheet 2

Inventor
John D. Brady
by Roberts, Cushman & Grover
att'ys.

United States Patent Office 2,710,347

Patented June 7, 1955

2,710,347

INTERFERENCE REDUCING CIRCUIT

John D. Brady, Lennox, Calif., assignor to Technicolor Motion Picture Corporation, Hollywood, Calif., a corporation of Maine Application June 3, 1952, Serial No. 291,411

3 Claims. (Cl. 250—20)

This invention relates to electronic apparatus for reducing the effect of interference on electrical signals such as are transmitted or received by radio, radar or television systems.

Electrical interference may be caused by ignition systems, neon signs, electric motors and the like and is usually so random in amplitude, frequency, phase and wave form that it cannot be controlled by devices which attempt to predict its character. Such interference is usually of several microseconds' duration and hence is particularly objectionable in television reception. Since each horizontal sweep of a standard television screen lasts about sixty-five microseconds, a single interference pulse may produce an extremely bright or dark streak across considerable part of the screen. Actually a single interference pulse will cause resonant circuits to oscillate and prolong the interference.

Attempts have been made to reduce such interference by employing highly directional antennas, noise filters, and signal limiting circuits which clip interference pulses above the maximum signal level. These attempts offer only a partial solution to the problem. A highly directional antenna installation is expensive and in many cases undesirable since it limits reception to one transmitting station; noise filters distort the signal and affect the contrast of the picture; and clipping circuits which prevent overloading of the receiver circuits still fail to obviate the objectionable black and white streaks in the picture.

The main object of the present invention is to reduce interference in a way which completely eliminates extreme variations in an electrical signal due to the interference, and hence avoids distortion of the intelligence represented by the electrical signal. In television receivers, for example, black or intense white streaks in the picture are prevented and the life of the screen is prolonged. In radio circuits amplifiers may be operated at higher gain without danger of overloading the amplifiers.

Another object is to accomplish interference reduction without severely distorting the electrical signal on which the interference is superimposed, and further to provide circuits which may be incorporated in existing amplifiers without altering the function of the amplifiers.

In a broad aspect the invention relates to a method of reducing the effect of interference on an electrical signal which comprises the steps of detecting the interference only so as to obtain a control voltage contemporaneous with the interference, transmitting the signal substantially without distortion thereof, blocking transmission of the signal contemporaneously with the interference by use of the control voltage so that the signal is transmitted with the interference removed, and substituting for the interference a voltage which is the average of the transmitted signal, with the result that interference is eliminated from the signal and a continuous transmitted signal produced without distortion or extreme variation of signal level. Preferably the average voltage is derived by integrating the electrical signal to obtain a voltage which is proportional to the average of the electrical signal.

In another aspect the invention relates to apparatus for reducing the effect of interference on an electrical signal, said electronic apparatus comprising controlled electronic valve means such as an amplifier or rectifier, said valve means normally passing the signal, a source of voltage proportional in amplitude to the average of said signal, connecting means for coupling said source to said valve means including second electronic valve means arranged to be controlled so as to pass the aforesaid proportional voltage, and a control circuit responsive to interference only and operative to control the aforesaid first and second valve means contemporaneously with the occurrence of the interference so as to substitute the average voltage for the interference in said signal, whereby the intereference is eliminated from the signal and a continuous signal produced without distortion or extreme variation of signal level. More specifically the apparatus includes input and output terminals, the first electronic valve means normally transmitting the signal from the input terminal to the output terminal without distortion, the second valve means being coupled to the first said valve means, so that the average voltage substituted for the interference results in a continuous signal at the output terminal.

In a further aspect the source of the aforesaid average voltage comprises an integrator network connected to the input terminal and operative to convert said signal into a voltage proportional to the average of the signal and normally blocked valve means controllable to transmit said proportional voltage. Preferably the integrator valve means comprises an electronic tube having a control electrode and bias means normally blocking the tube. More specifically the bias means applies a bias voltage sufficient to block transmission of the average voltage and the control circuit produces a control pulse substantially equal in amplitude to the bias voltage. Preferably the control circuit comprises a clipping circuit including electronic tube means biased below cutoff by a voltage approximating the maximum level of the electrical signal so as to pass only a portion of the interference greater in amplitude than said maximum level.

For the purpose of illustration typical embodiments of the invention are shown in the accompanying drawings in which Fig. 1 is a block diagram of television receiving circuits showing the relation of the present interference reducing circuit thereto;

Figure 1:
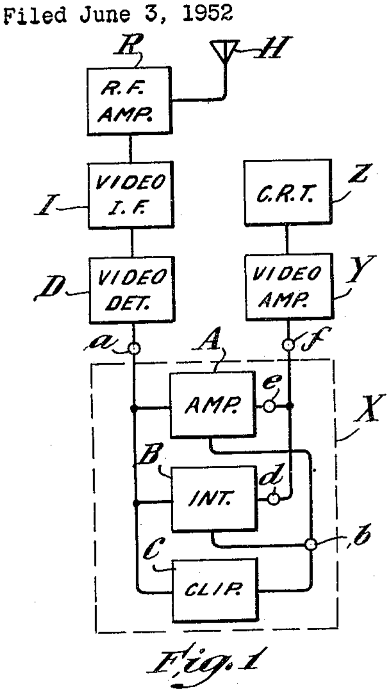

By way of illustration the present interference reducing circuit X is shown in Fig. 1 in relation to the conventional stages of a television receiver. The conventional parts of the receiver include an antenna H, and R. F. amplifier R, an amplifier I of an intermediate video frequency, a detector D of the video signal, a video signal amplifier Y and a cathode ray tube Z for presenting the video signal visually. The interference reducing circuit X is connected to the video detector D and the video amplifier Y at input terminal *a* and output terminal *f* respectively.

The interference reducing circuit X broadly comprises a controlled amplifier channel A, an integrating channel B and a clipping channel C. In the interference reducing circuit intermediate the input terminal *a* and the final output terminal *f* are a clipper output terminal *b*, an integrator output terminal *d* and an amplifier output terminal *e*. The wave forms 2*a* to 2*f* inclusive of Fig. 2 appear at the terminals *a* to *f* respectively. It will be understood that these wave forms are somewhat idealized for purposes of clarity, and that in the illustrated circuits they may exist in inverted form when so indicated in the following description.

Figure 2:
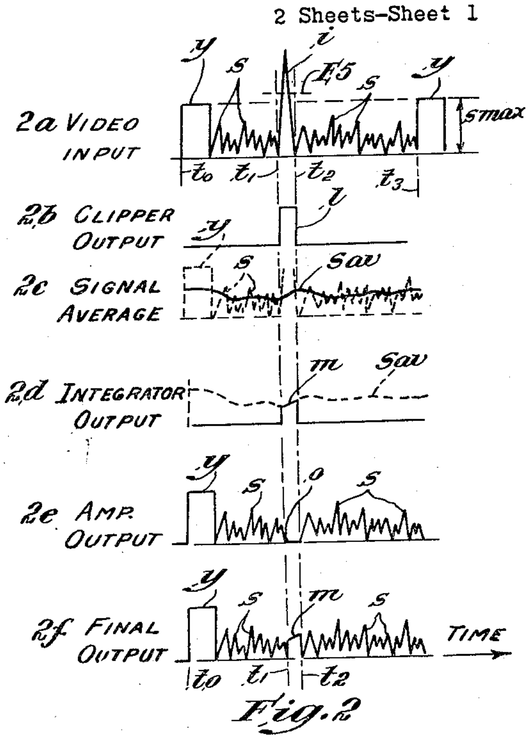
Fig. 2 is a graphic representation of voltages occurring in the interference reducing circuit.
Figure 3:
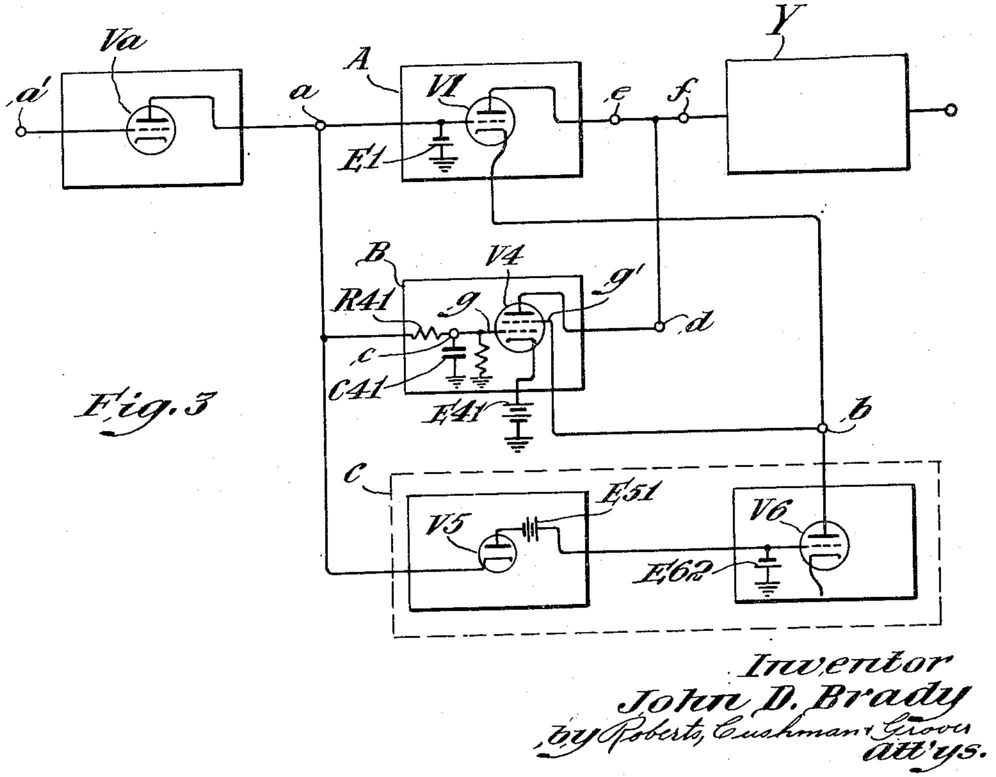
Fig. 3 is a schematic diagram of one embodiment of the interference reducing circuit.

The video signal applied to the interference reducing circuit X is represented by wave form 2*a* which comprises a synchronizing pulse *y* and image signals *s*. This wave form is typical of the video signal appearing during the period $t_0$ to $t_3$ of a single horizontal television sweep, with an interference pulse *i* superimposed on the video signal during time $t_1$ to $t_2$. It should also be understood that the amplitude of the interference pulse *i* is greatly reduced relative to the image voltages and that the sides of the pulse are more nearly vertical than shown in Fig. 2. The signal represented by wave form 2*a* is applied respectively to the controlled amplifier A, the integrating channel B and the clipper channel C. In the embodiment of Fig. 3 the wave form 2*a* at terminal *a* will be of "positive" polarity as shown in Fig. 2, while in the embodiment of Fig. 4 it will be inverted or of "negative" polarity.

According to the embodiment of Fig. 3 controlled amplifier A includes a video signal amplifier V1 such as the type 6AC7 biased nearly to cut-off by a voltage source E1 so that in the absence of interference the video signal will be amplified in the usual way without distortion and applied through the amplifier and final output terminals *e* and *f* to the video amplifier channel Y of the television receiver. However, if interference is present in the video signal, the amplifier V1 may be prevented from conducting by the application of a control voltage which drives the amplifier below cutoff as will be more fully explained.

To provide some amplification ahead of the interference reducing circuit X and also to isolate circuit X from the preceding circuits of the television receiver it is desirable to place a buffer amplifier V*a* intermediate terminal *a'* at the video detector output and terminal *a* at the interference reducing circuit input. This amplifier may be one of the stages of the video amplifier channel Y.

The integrator channel B includes a time constant or RC network, namely, resistor R41 and capacitor C41, and an amplifier tube V4 such as RCA tube type 6AC7 which has a first control grid *g* and a second control grid *g'*. The integrator tube V4 is biased below cutoff by a voltage source E41 to the extent that video signals below the level *s* max. as shown in Fig. 2 at 2*a* do not cause it to conduct. By well-known integrator circuit action the time constant network R41—C41 reduces the wide variations of the video signal *s* to a very slowly varying voltage *s* av. which is the average of the video signal 2*a* as shown at 2*c* of Fig. 2. This average voltage exists at terminal *c* at all times but is not transmitted to the integrator output terminal *d* until the integrator tube V4 is unblocked by a control pulse *l* to be described with relation to the clipper circuit.

The clipper circuit C comprises a clipper tube V5 and a limiter tube V6 (RCA tubes type 6AL5 and 6AG7, respectively). The clipper tube V5 is biased below cutoff by a suitable voltage source E51 to a point where the clipper does not pass the voltages of the video signal 2*a* which are below the maximum voltage *s* max. However, a portion of the interference pulse *i* greater in amplitude than the voltage *s* max. is conducted by the clipper tube V5 as a single negative pulse *l*. The limiter triode V6 is held by a voltage source E62 above cutoff to the extent that the peak of the clipped negative pulse drives the limiter tube V6 to cutoff and produces a positive square wave control pulse *l* limited in amplitude and contemporaneous with the interference pulse *i* (see wave form 2*b*). When the control pulse *l* is applied to the second control grid *g'* of the integrator tube V4, the integrator tube will conduct for the period of the control pulse, which is the period $t_1$–$t_2$ of the interference pulse, so as to produce at the integrator output terminal *d* a pulse *m* whose amplitude is proportional to the average value of the video signal as determined by the integrator network R41—C41. The positive control pulse *l* appearing at the clipper output terminal *b* is also applied to the cathode of the controlled amplifier tube V1. This voltage drives the cathode *k* of tube V1 sufficiently positive with relation to grid *g* of the tube V1 to block the tube for the duration of the control pulse. A wave form like 2*e* but inverted appears at the output terminal *e* of the controlled amplifier V1, this signal having dropped to no-signal level during the time $t_1$–$t_2$. At the final output terminal *f* the average or substitute voltage *m* is mixed with the interrupted signal 2*e* so as to produce the corrected signal 2*f* which may be then applied to subsequent stages of the video amplifier Y.

Figure 4:
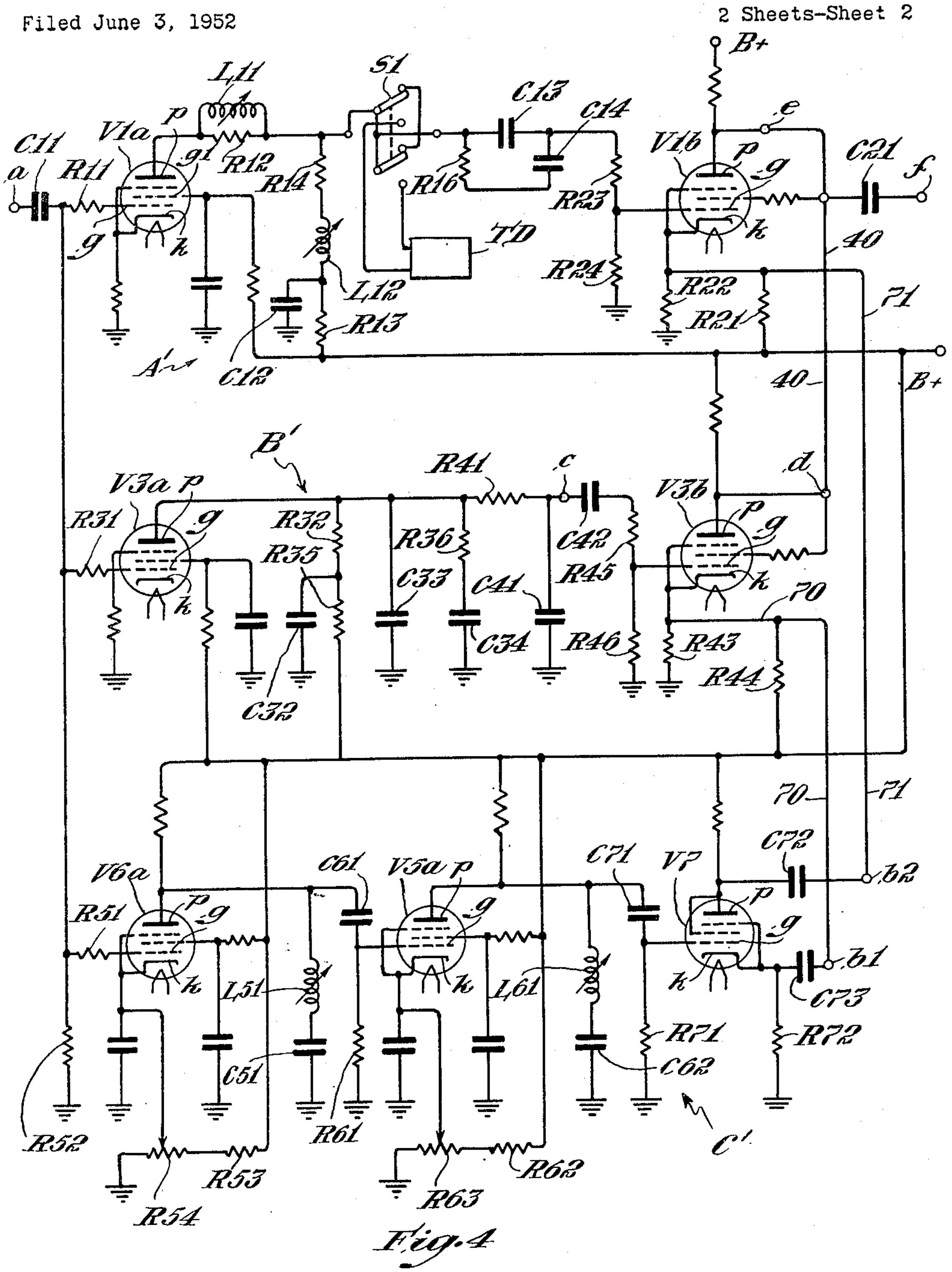
Fig. 4 is a schematic diagram of another embodiment.

In Fig. 4 is illustrated a more specific wiring diagram of another embodiment of the interference reducing circuit X. In this diagram conventional circuit components are illustrated without further description since they are employed in the usual manner and do not comprise any part of the present invention. Suitable values for the components identified by reference characters are given in a table at the end of the following description.

In Fig. 4 the amplifier channel A' includes a buffer amplifier tube V1*a* and a controlled amplifier V1*b*; the integrator channel B', tubes V3*a* and V3*b*; and the clipper and limiter channel C', tubes V5*a* to V7. It is, of course, necessary that the control pulse *l* be applied to the controlled amplifier V1*b* during the period $t_1$–$t_2$ in order fully to eliminate the interference pulse *i* from the video signal. Likewise it is essential that the average signal *m* be mixed with the interrupted video signal 2*e* at the same period of time. While the various signals may be properly phased by careful location of parts and wiring it may be desirable to include a delay line such as time variable delay TD for final accurate phasing. According to its well-known function the time delay network TD acts to retard transmission of the amplified video signal to compensate for any delay in the integrator and clipper circuits. A gang switch S1 illustrates how the time delay network may be introduced into the connection between the amplifier tubes V1*a* and V1*b*.

A video signal like that shown at 2*a* of Fig. 2 but inverted is applied to the input terminal *a* and is coupled through capacitor C11 and resistor R11 to the grid *g* of the amplifier tube V1*a*. Associated with the first amplifier tube V1*a* is a peaking network comprsing an inductance L11 and resistance R12. Plate voltage is applied to the plate *p* of tube V1*a* through a peaking network comprising resistors R13 and R14, choke coil L12 and capacitor C13.

The positive video signal at the plate *p* of tube V1*a* is applied through a coupling capacitor C13 and dropping resistor R23 to the grid *g* of the controlled amplifier tube V1*b*. Resistor R16 and capacitor C14 in conjunction with C13, R23, and R24 provide the desired frequency response. Resistors R23 and R24 reduce the signal applied to the grid *g* in proportion to their relative values. The cathode *k* of the controlled amplifier V2 is held at or slightly above cutoff voltage by voltage dividing resistors R21 and R22 which are connected to the plate voltage supply B+. The inverted or "negative" video signal appearing at the plate of controlled amplifier V1*b* and at terminal *e* is coupled through the capacitor C21 to the final output terminal *f*.

The "negative" or inverted video signal appearing at input terminal *a* is also coupled through resistor R31 to the control grid *g* of the first tube V3*a* of the integrator channel B'. Amplifier V3*a* acts as a buffer tube isolating the subsequent integrator stage from the video signal input terminal *a*. The "positive" video signal appearing at the plate *p* of the buffer tube V3*a* is isolated from plate supply variations with load by resistors R32 and R35, and capacitor C32. The high frequency components of the video signal are filtered to a certain extent by capacitors C33 and C34 and resistor R36 and the signal then applied to the integrator network comprising resistor R41 and capacitor C41. The effect of the RC network is such that the voltage at terminal *c* does not follow the rapidly fluctuating video voltage but instead approximates the average value of the voltage. The average voltage is coupled through capacitor C42 and resistor R45 to the grid *g* of the integrator tube V3*b*, resistors R45 and R46 acting as voltage dividers. Positive bias is provided at the cathode *k* of the integrator tube V3*b* by voltage dividing resistors R43 and R44 connected to the plate supply B+. This positive voltage is sufficient to hold the integrator tube V3*b* below cutoff to the extent that the average signal *s* av. applied to the control grid *g* does not cause the integrator tube to conduct until a control voltage *l* is applied to the cathode *k* of tube V3*b* through connection 70 from the last tube V7 of the clipper and limiter channel C'.

In the clipper channel C' the inverted signal 2*a* developed across grid resistor R52 is coupled through resistor R51 to the grid *g* of the limiter tube V6*a*. The cathode *k* of the limiter tube V6*a* is held positive with respect to the grid by voltage dividing resistors R53 and R54 connected between the B+ supply and ground. Variable resistor R54 is adjusted so that the limiter tube V6*a* transmits all of the video signal except the peak of the interference pulse *i* with the result that the peak of the interference is squared. The positive video signals and square topped interference pulse are accentuated by a peaking circuit comprising coil L51 and capacitor C51, and coupled through capacitor C61. The voltage developed across grid resistor R61 is applied to the grid *g* of the clipper tube V5*a*. A positive voltage is applied to the cathode of clipper V5*a* by voltage dividing resistors R62 and R63. The variable resistor R63 is adjusted to hold the clipper tube V5*a* below cutoff unless a signal of greater amplitude than the maximum voltage *s* max. of the video signal *s* as shown at 2*a* of Fig. 2 is applied to its grid. The result is that the clipper tube V5*a* amplifies only the square topped interference pulse, and thus the voltage appearing at the plate *p* of tube V5*a* will appear like the voltage *l* of wave form 2*b* but inverted. The sharp rise and fall of this voltage is further accentuated by a peaking circuit including the coil L61 and the capacitor L62 and applied through coupling capacitor C71 to the grid *g* of a cathode follower V7. The signal voltage developed across the grid resistor R71 is sufficient to cause the grid *g* to overcome a small positive bias produced by cathode resistor R72. The positive output at the plate *p* of tube V7 is coupled through capacitor C72 to terminal *b*2. A similar pulse, but inverted, is coupled from the cathode *k* through capacitor C73 to terminal *b*1. The positive control pulse *l* is applied through connection 71 to the cathode *k* of the controlled amplifier V1*b*. The voltage amplitude of this pulse is sufficient to drive the cathode *k* of tube V1*b* positive with respect to the grid to the extent that it will block the tube from conducting during the period $t_1$–$t_2$ of the interference pulse and reduce the video signal to zero signal level for this period. Being blocked during this period the controlled amplifier fails to amplify the interference pulse and produces at terminal *e* a video signal like wave form 2*e* inverted and interrupted during the period of the interference pulse. It should be noted that if no interference is superimposed on the video signal the controlled amplifier V1*b* will amplify the video signal normally without distorting or otherwise limiting the video signal.

At the same time that the control pulse *l* at clipper output terminal *b*2 blocks the controlled amplifier V1*b*, the inverted control pulse at clipper output terminal *b*1 is applied to the cathode *k* of the integrator tube V3*b* through connection 70. The "negative" amplitude of this inverted control pulse *l* is sufficient to overcome the positive bias on the cathode *k* of the integrator tube V3*b* and permit the integrator tube to conduct. The inverted control pulse compensates for the positive bias supplied to the cathode *k* of tube V3*b* by the voltage dividing resistors R43 and R44, and consequently the average or integrated voltage *s* av. applied at the grid *g* of tube V3*b* produces a "negative" voltage pulse *m* at the integrator output terminal *d* which is proportional to the average voltage of the video signal. This "negative" average pulse *m* appearing in wave form 2d of Fig. 2 is carried through connection 40 and superimposed on the "negative" interrupted video signal 2*e* of Fig. 2 appearing at the controlled amplifier output terminal *e*. The composite wave form is coupled to final output terminal *f* by capacitor C21 and appears like wave form 2*f* of Fig. 2 but inverted.

Types or values for the circuit components identified in Fig. 4 are as follows:

| | | |
|---|---|---|
| **V1***a* | | 6AC7 |
| **V1***b* | | 6AG7 |
| **V3***a* | | 6AC7 |
| **V3***b* | | 6AG7 |
| **V5***a* | | 6AC7 |
| **V6***a* | | 6AC7 |
| **V7** | | 6AG7 |
| **C11** | microfarads | 0.5 |
| **C12** | do | 10 |
| **C13** | do | 0.02 |
| **C14** | do | 0.02 |
| **C21** | do | 0.5 |
| **C32** | do | 10 |
| **C33** | do | 0.001 |
| **C34** | do | 0.01 |
| **C41** | do | 0.001 |
| **C42** | do | 0.1 |
| **C51** | do | 1 |
| **C61** | do | 0.1 |
| **C62** | do | 1 |
| **C71** | do | 0.1 |
| **C72** | do | 2 |
| **C73** | do | 2 |
| **L11**, **L12**, **L51**, **L61** | microhenries | 25–50 |
| **R11** | ohms | 100 |
| **R12** | do | 5,000 |
| **R13** | do | 10,000 |
| **R14** | do | 1,000 |
| **R16** | do | 1,500,000 |
| **R21** | do | 150,000 |
| **R22** | do | 1,000 |
| **R23** | do | 100 |
| **R24** | do | 1,000 |
| **R31** | do | 100 |
| **R32** | do | 1,000 |
| **R35** | do | 10,000 |
| **R36** | do | 100,000 |
| **R41** | do | 1,000 |
| **R43** | do | 1,000 |
| **R44** | do | 50,000 |
| **R45** | do | 100 |
| **R46** | do | 1,000,000 |
| **R51** | do | 100 |
| **R52** | do | 250,000 |
| **R53** | do | 50,000 |
| **R54** | do | 0–5,000 |
| **R61** | do | 100,000 |
| **R62** | do | 50,000 |
| **R63** | do | 0–5,000 |
| **R71** | do | 25,000 |
| **R72** | do | 5,000 |

It should be understood that the present interference reducing circuit is not limited to use with television receivers, but may be advantageously employed in association with other electronic devices such as radio or radar transmitters and receivers where it is desired to eliminate the extreme voltage variations produced by interference. In many such cases the present invention will prolong the life of cathode ray tubes and permit amplifiers to operate at higher gain without danger of overloading. The installation of antennas is simplified since much local interference need not be taken into consideration.

While I have disclosed specific embodiments of my invention for the purpose of illustration, it should be understood that the invention includes all modifications and equivalents falling within the scope of the appended claims.

1. For reducing the effect of interference on an electrical signal, electronic apparatus comprising a signal input terminal and an output terminal, electronic valve means connected to said input terminal, said means normally transmitting the signal and controllable to partially interrupt transmission of the signal thereby to transmit an uninterrupted signal, an integrator network connected to said input terminal for converting said signal to a voltage proportional to the average of said signal, normally blocked valve means controllable to transmit said proportional voltage, a clipping circuit connected to said input terminal and responsive to interference only to produce a control voltage contemporaneous therewith, connections for applying the control voltage to said valve means respectively to block transmission of the first said means and interrupt said signal contemporaneously with said interference and simultaneously unblock the second said valve means to transmit said proportional voltage, and means for coupling the interrupted signal and proportional voltage to said output terminal to superimpose said proportional voltage on said signal, whereby said interference is eliminated and a continuous signal produced without distortion or extreme variation of signal level.

2. For reducing the effect of interference on an electrical signal, electronic apparatus comprising a controlled tube normally transmitting said signal and having a control electrode for blocking amplification, an integrator circuit including an integrating network for producing a voltage proportional in amplitude to the average of said signal and integrator tube means having a control electrode, bias means normally blocking the integrator tube, a clipping circuit including tube means biased below cutoff by a voltage approximating the maximum level of said signal so as to pass only a portion of the interference greater in amplitude than said maximum level, connections for applying said portion to said controlled tube electrode to block the controlled tube and produce an amplified signal interrupted contemporaneously with the interference, connections for applying said portion to the integrator tube control electrode to unblock said tube and produce a substitute voltage contemporaneous with the interference and porportional to the average of said signal, and means coupling the integrator tube to the controlled tube so as to superimpose the substitute voltage on said interrupted signal, whereby said interference is eliminated and a continuous signal produced without distortion or extreme variation of signal level.

3. Apparatus according to claim 2 characterized in that said integrator tube bias means applies a bias voltage sufficient to block transmission of said average voltage and said integrator tube produces a control pulse substantially equal in amplitude to said bias voltage.

References Cited in the file of this patent

UNITED STATES PATENTS

| | | |
|---|---|---|
| 2,151,773 | Koch | Mar. 28, 1939 |
| 2,151,774 | Koch | Mar. 28, 1939 |
| 2,151,778 | Landon | Mar. 28, 1939 |
| 2,446,244 | Richmond | Aug. 3, 1948 |
| 2,459,798 | Dettman | Jan. 25, 1949 |
| 2,489,297 | Labin | Nov. 29, 1949 |